US012673527B2

(12) United States Patent
Kubota

(10) Patent No.: US 12,673,527 B2
(45) Date of Patent: Jul. 7, 2026

(54) VEHICLE DAMPER

(71) Applicant: HONDA MOTOR CO., LTD., Tokyo (JP)

(72) Inventor: Kohei Kubota, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 165 days.

(21) Appl. No.: 18/467,733

(22) Filed: Sep. 15, 2023

(65) Prior Publication Data

US 2024/0109389 A1 Apr. 4, 2024

(30) Foreign Application Priority Data

Sep. 30, 2022 (JP) ................................. 2022-158039

(51) Int. Cl.
*B60G 17/06* (2006.01)
*F16F 15/03* (2006.01)
(52) U.S. Cl.
CPC .............. *B60G 17/06* (2013.01); *F16F 15/03* (2013.01); *B60G 2202/22* (2013.01); *F16F 2232/06* (2013.01)
(58) Field of Classification Search
CPC ........................... B60G 17/06; B60G 2202/22; B60G 2202/42; B60G 2204/419; F16F 15/03; F16F 2232/06; F16F 13/00; F16F 15/046; F16F 15/08; F16F 2222/06
See application file for complete search history.

(56) References Cited

U.S. PATENT DOCUMENTS

| | | | | |
|---|---|---|---|---|
| 7,357,229 B2 * | 4/2008 | Kondo | ..................... | F16F 15/03 |
| | | | | 188/267 |
| 8,042,658 B2 * | 10/2011 | Kondo | ................... | B60G 15/10 |
| | | | | 188/267 |
| 8,469,370 B2 * | 6/2013 | Kondo | ................... | B60G 17/02 |
| | | | | 280/5.514 |
| 8,490,761 B2 * | 7/2013 | Kondo | ................. | B60G 15/068 |
| | | | | 188/266.5 |
| 11,472,250 B2 * | 10/2022 | Yamamoto | ............ | F16F 13/005 |
| 2004/0012136 A1 * | 1/2004 | Mennesson | ............ | B60G 11/52 |
| | | | | 267/219 |

(Continued)

FOREIGN PATENT DOCUMENTS

JP 2013096536 A 5/2013

*Primary Examiner* — Kurt Philip Liethen
(74) *Attorney, Agent, or Firm* — CKC & PARTNERS CO., LLC

(57) ABSTRACT

A vehicle damper includes: a movable member that moves with linear motion according to a load applied from a wheel; a conversion member that converts the linear motion of the movable member into rotational motion; an electric motor having a rotor that rotates in conjunction with the rotational motion; a motor housing that houses the electric motor; and a damper mount housing that is fixed to a vehicle body and connected to the motor housing via a first elastic member. The vehicle damper dampens the linear motion of the movable member by an electromagnetic force of the electric motor. The vehicle damper has a second elastic member that is provided for at least one of the motor housing or the damper mount housing and abuts on the other of the motor housing or the damper mount housing when the motor housing and the damper mount housing approach each other.

6 Claims, 7 Drawing Sheets

(56)        References Cited

U.S. PATENT DOCUMENTS

| | | | | |
|---|---|---|---|---|
| 2005/0212189 A1* | 9/2005 | Kondo | .................... | F16F 15/03 |
| | | | | 267/195 |
| 2010/0044937 A1* | 2/2010 | Lee | ........................ | B60G 15/12 |
| | | | | 267/113 |
| 2010/0065993 A1* | 3/2010 | Kondo | .................... | F16F 15/03 |
| | | | | 267/64.16 |
| 2011/0018214 A1* | 1/2011 | Kondo | .................... | F16F 15/03 |
| | | | | 280/5.515 |
| 2012/0181767 A1* | 7/2012 | Kondo | .................. | B60G 17/02 |
| | | | | 280/124.16 |
| 2022/0314723 A1* | 10/2022 | Kubota | .................. | B60G 15/04 |
| 2022/0314726 A1* | 10/2022 | Kubota | ............... | B60G 15/067 |

* cited by examiner

VEHICLE DAMPER

This application is based on and claims the benefit of priority from Japanese Patent Application No. 2022-158039, filed on 30 Sep. 2022, the content of which is incorporated herein by reference.

BACKGROUND OF THE INVENTION

Field of the Invention

The present invention relates to a vehicle damper.

Related Art

A vehicle suspension system has been known. This vehicle suspension system converts vibrations of a vehicle from linear motion to rotational motion via a ball screw shaft and a ball screw nut arranged in a housing, transmits the rotational motion to a rotor of a motor, and dampens the rotational force of the rotor with torque derived from an electromagnetic force (see, e.g., Patent Document 1).

This vehicle suspension system includes a high-impact absorption stopper as a shaft end member arranged at an end of the ball screw shaft to relieve impact of collision of the shaft end member and a bottom surface of the housing when an excessive load is applied and large linear movements are made.

Patent Document 1: Japanese Unexamined Patent Application, Publication No. 2013-96536

SUMMARY OF THE INVENTION

When a vehicle damper is overloaded, a greater load is applied to a damper mount. An impact of the overload on the damper mount affects stable behavior of the vehicle. Thus, the vehicle damper is required to make the vehicle's behavior more stable by giving higher rigidity to the damper mount and quickly absorbing the impact when overloaded. The rigidity needs to be high in view of durability of a damper mount rubber.

Regarding a high frequency low load applied from a road surface, the vehicle damper does not need to quickly respond, and is required to block the application of the load to make the ride of the vehicle more comfortable.

The present invention provides a vehicle damper that can reduce load application to a damper mount when the vehicle damper is overloaded, can make the vehicle behave more stably by immediately absorbing impact, and can make the ride of the vehicle more comfortable by blocking the application of a high frequency low load.

(1) A vehicle damper (e.g., a vehicle damper 1 described later) of the present invention includes: a movable member (e.g., a movable member 2 described later) that moves with linear motion according to a load applied from a wheel; a conversion member (e.g., a conversion member 7 described later) that converts the linear motion of the movable member into rotational motion; an electric motor (e.g., an electric motor 3 described later) having a rotor (e.g., a rotor 32 described later) that rotates in conjunction with the rotational motion converted by the conversion member; a motor housing (e.g., a motor housing 4 described later) that houses the electric motor; and a damper mount housing (e.g., a damper mount housing 5 described later) that is fixed to a vehicle body (e.g., a vehicle body BD described later) and connected to the motor housing via a first elastic member (e.g., a damper mount rubber 53 described later). The vehicle damper dampens the linear motion of the movable member by an electromagnetic force of the electric motor, and has a second elastic member (e.g., an additional rubber 6, 6A described later) that is provided for at least one of the motor housing or the damper mount housing and abuts on the other of the motor housing or the damper mount housing when a load is applied and the motor housing and the damper mount housing approach each other.

(2) In the vehicle damper of aspect (1), the second elastic member has higher rigidity than the first elastic member.

(3) In the vehicle damper of aspect (1) or (2), the second elastic member has an annular shape.

(4) In the vehicle damper of aspect (3), the motor housing has a shaft (e.g., a shaft 452 described later) connected to the damper mount housing via the first elastic member. The motor housing and the damper mount housing have opposing faces (e.g., opposing faces 454 and 523) that are spaced from each other and face each other around the shaft. The second elastic member is provided on the opposing face of at least one of the motor housing or the damper mount housing.

(5) The vehicle damper of any one of aspects (1) to (4) further includes a protrusion (e.g., a protrusion 524 described later) that protrudes from at least one of the motor housing or the damper mount housing toward the other of the motor housing or the damper mount housing to protect the second elastic member from excessive compression.

(6) In the vehicle damper of any one of aspects (1) to (5), a contact surface (e.g., a contact surface 6a described later) of the second elastic member (e.g., an additional rubber 6A described later) to be in contact with the other of the motor housing or the damper mount housing is inclined with respect to the opposing face of the other of the motor housing or the damper mount housing and is substantially parallel to a plane (e.g., a plane PL described later) perpendicular to the direction of the linear motion of the movable member.

The present invention provides a vehicle damper that can reduce load application to a damper mount when the vehicle damper is overloaded, can make the vehicle behave more stably by immediately absorbing impact, and can make the ride of the vehicle more comfortable by blocking the application of a high frequency low load.

DETAILED DESCRIPTION OF THE INVENTION

Figure 1:
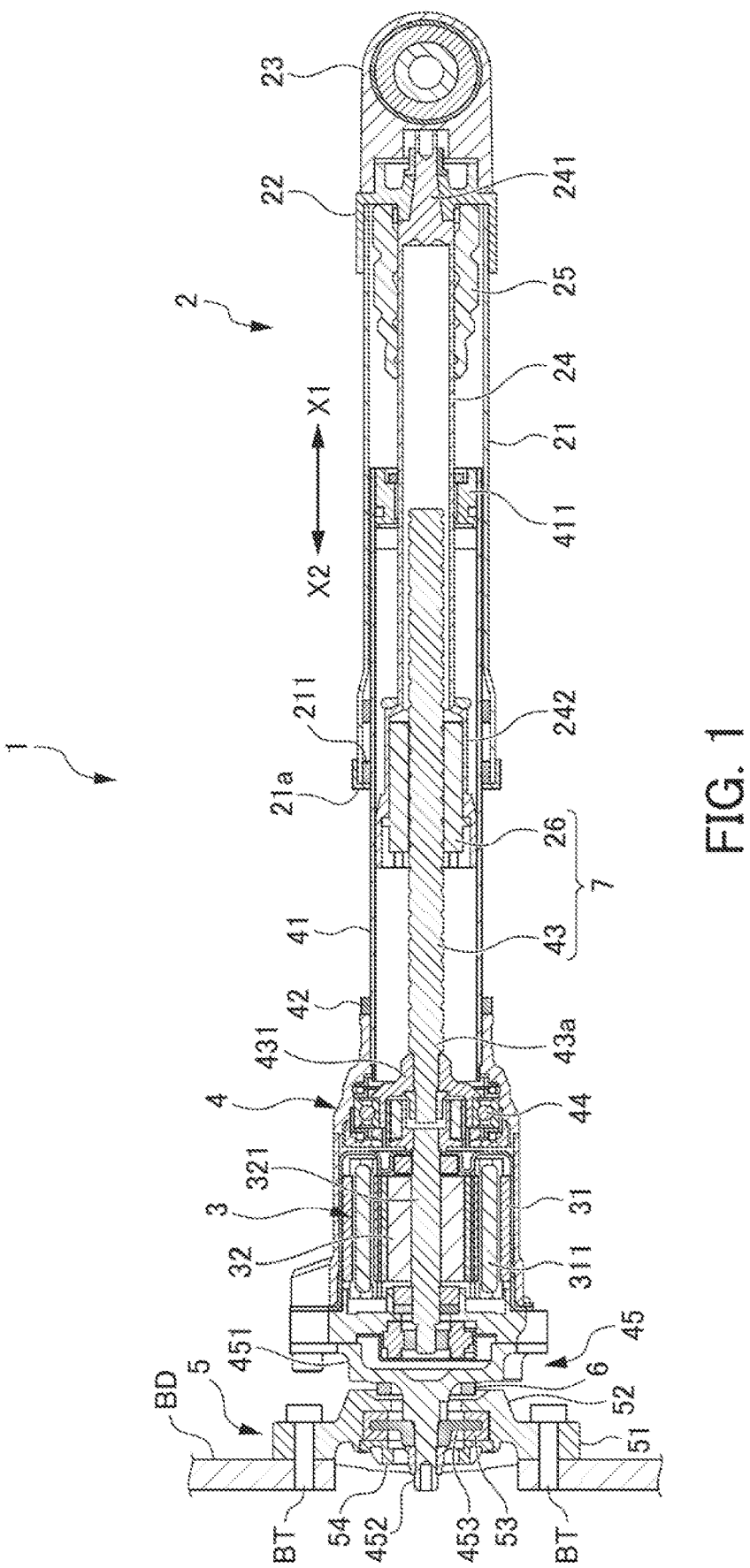
FIG. 1 is a sectional view illustrating a vehicle damper in a normal state.

Embodiments of a vehicle damper of the present invention will be described in detail below with reference to the drawings. As shown in FIG. 1, a vehicle damper 1 is suspended, for example, between a vehicle body BD of a four-wheel vehicle and a lower arm (not shown) constituting an unspring member closer to a wheel (not shown). The vehicle damper 1 includes a movable member 2, an electric motor 3, a motor housing 4, and a damper mount housing 5.

The movable member 2 includes a tubular outer cylinder 21. One of axial ends of the outer cylinder 21 (a right end in FIG. 1) is closed by a blocking member 22. A connecting part 23 to be connected to the lower arm or any other component is attached to the blocking member 22. The movable member 2 is "movable" because it can move relative to the components of the vehicle damper 1 connected to the vehicle body BD when receiving a load applied from the wheel.

The outer cylinder 21 houses a first inner cylinder 24 extending from the blocking member 22 in the axial direction of the outer cylinder 21. A protruding shaft 241 is integrally formed at one of axial ends of the first inner cylinder 24 (a right end in FIG. 1). The protruding shaft 241 is fixed to the center of the blocking member 22. Thus, the first inner cylinder 24 is fixed to the outer cylinder 21 to be nonrotatable about the axis via the blocking member 22. A buffer member 25, which is an impact-absorbing elastic member made of rubber or any other suitable material, is provided inside the outer cylinder 21 to surround the periphery of the one end of the first inner cylinder 24.

The other axial end of the first inner cylinder 24 (a left end in FIG. 1) is formed into a large diameter part 242 having a large inner diameter. The large diameter part 242 has an outer diameter smaller than the inner diameter of the outer cylinder 21. A ball screw nut 26 that is threadedly engaged with a ball screw 43 described later is attached to the inside of the large diameter part 242 to be nonrotatable about the axis of the large diameter part 242.

The electric motor 3 has a stator 31 having a coil 311 and a rotor 32 having a permanent magnet (not shown). The rotor 32 has a rotor shaft 321 and is rotatably supported at the center of the stator 31. The electric motor 3 generates an electromagnetic force corresponding to a current supplied to the coil 311 from a driving device (not shown) installed on the vehicle (not shown) and rotates the rotor 32 or attenuates the rotational force of the rotor 32 using torque corresponding to the electromagnetic force.

The motor housing 4 is substantially cylindrical and houses the electric motor 3. Part of the motor housing 4 closer to one of axial ends (a right end in FIG. 1) than the electric motor 3 has a smaller diameter than the electric motor 3. A tubular second inner cylinder 41 is connected to the inside of the one end of the motor housing 4 to be concentric with the motor housing 4. The second inner cylinder 41 has a smaller diameter than the outer cylinder 21 of the movable member 2 and a larger diameter than the large diameter part 242 of the first inner cylinder 24. An annular bump rubber 42 is attached to an edge of the one end of the motor housing 4 to surround the periphery of the second inner cylinder 41. The bump rubber 42 is an impact-absorbing elastic member made of rubber or any other suitable material.

The outer cylinder 41 houses a ball screw 43. The ball screw 43 extends from the motor housing 4 in the axial direction over almost the whole length of the second inner cylinder 41. A proximal end 43a of the ball screw 43 (a left end in FIG. 1) is coaxially connected to the rotor shaft 321 of the electric motor 3 via a connector 431. The connector 431 is supported in the motor housing 4 to be rotatable about the axis via a bearing 44. When the ball screw 43 rotates about the axis, the rotor 32 of the electric motor 3 rotates via the connector 431 and the rotor shaft 321.

The movable member 2 concentrically fits on the second inner cylinder 41. Specifically, the second inner cylinder 41 is inserted and housed in the outer cylinder 21 of the movable member 2, while housing the first inner cylinder 24 of the movable member 2 inserted in the second inner cylinder 41. A ball screw nut 26 placed in the first inner cylinder 24 is threadedly engaged with the ball screw 43 in the second inner cylinder 41. A sealing members 211 seals a gap between the outer peripheral surface of the second inner cylinder 41 and the inner peripheral surface of the outer cylinder 21, and a sealing member 411 seals a gap between the inner peripheral surface of the second inner cylinder 41 and the outer peripheral surface of the first inner cylinder 24. The other end of the outer cylinder 21 (a left end in FIG. 1) faces the bump rubber 42 of the motor housing 4. An end of the second inner cylinder 41 provided with the sealing member 411 faces the buffer member 25 in the outer cylinder 21.

The other end of the motor housing 4 (a left end in FIG. 1) is closed by an end member 45. The end member 45 has a large diameter part 451 that blocks the other end of the motor housing 4 and a shaft 452 that protrudes from the center of the large diameter part 451 toward the vehicle body BD. An annular flange 453 is fixed to the outer periphery of a middle part of the shaft 452. The flange 453 extends radially outward from the shaft 452 into a round shape.

A damper mount housing 5 is fixed to a predetermined position of the vehicle body BD with bolts BT. The damper mount housing 5 includes an annular mount 51 and an annular support 52 that are integral with the damper mount hosing 5. The mount 51 is attached to the vehicle body BD. The support 52 bulges from a radially inner part of the mount 51 toward the motor housing 4.

Figure 2:
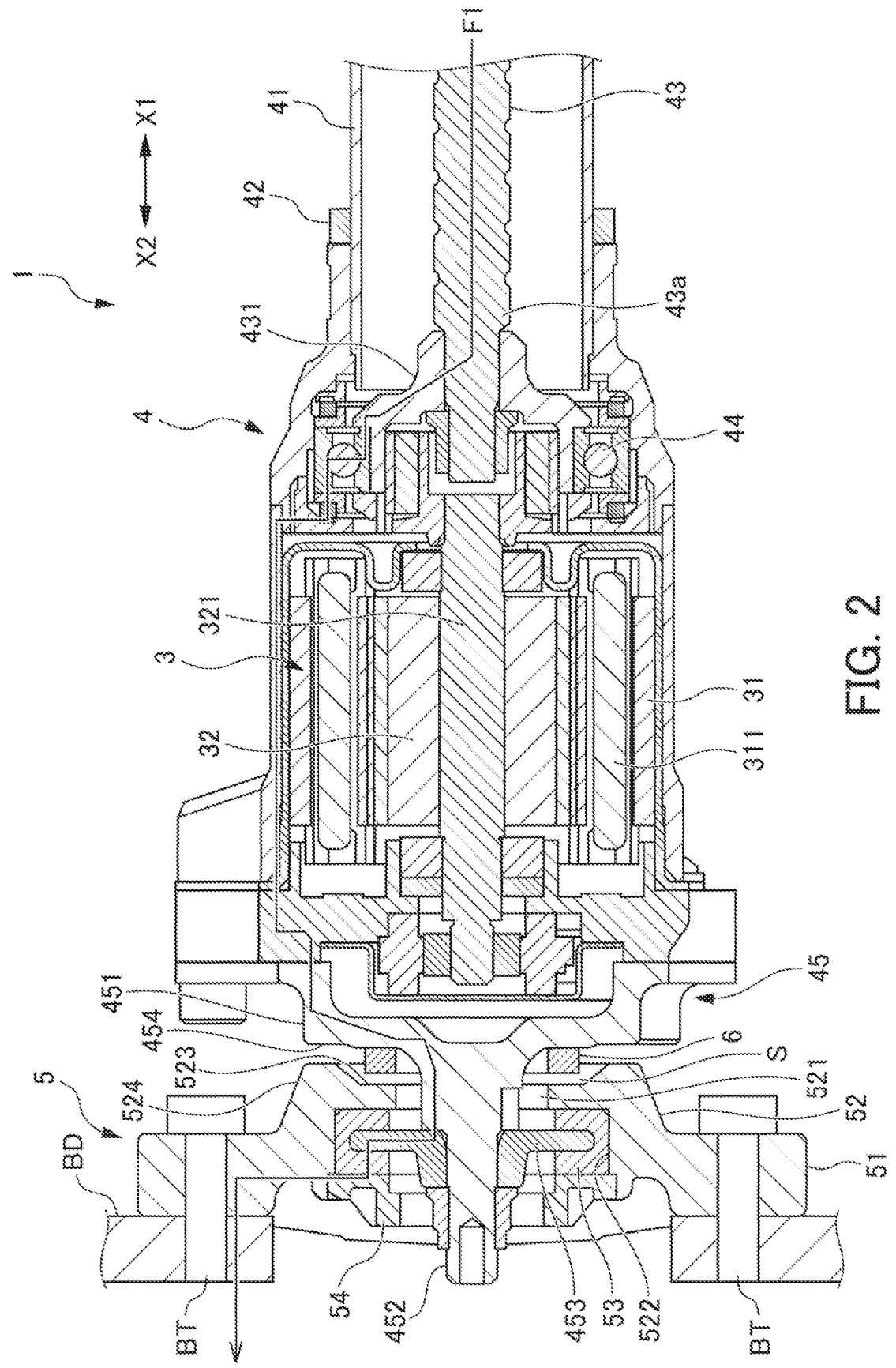
FIG. 2 is a sectional view illustrating the vehicle damper in the normal state, partially enlarged.

As shown in FIG. 2, the support 52 is provided with an opening 521 that opens at the center and a rubber receiving groove 522 that opens toward the vehicle body BD and has a larger diameter than the opening 521. The rubber receiving groove 522 is aligned with the opening 521 and is in a round shape concentric with the opening 521. The rubber receiving groove 522 houses an annular damper mount rubber 53 which is an elastic member made of rubber or any other suitable material. The damper mount rubber 53 is held in the rubber receiving groove 522 by an annular blocking ring 54 attached to close the rubber receiving groove 522 from the vehicle body BD. The damper mount rubber 53 corresponds to a first elastic member.

The shaft 452 of the end member 45 of the motor housing 4 is connected to the damper mount housing 5 attached to the vehicle body BD via the damper mount rubber 53. Specifically, the shaft 452 is inserted into the opening 521 of the support 52 of the damper mount housing 5 from the side opposite to the vehicle body BD. The shaft 452 passes through the damper mount rubber 53 held in the rubber receiving groove 522 and the blocking ring 54. The damper mount rubber 53 holds the flange 453 on the shaft 452 from both sides in the rubber receiving groove 522 to support the shaft 452. Thus, the damper mount housing 5 is connected to the motor housing 4 via the damper mount rubber 53.

The motor housing 4 and the damper mount housing 5 face each other with a predetermined gap left between the housings in a normal state, i.e., when the vehicle damper 1 is not overloaded, as shown in FIG. 2. The motor housing 4 and the damper mount housing 5 make no contact with each other except that the flange 453 is held by the damper mount rubber 53.

Specifically, the large diameter part 451 of the end member 45 has an opposing face 454 that faces the damper mount housing 5 around the shaft 452. The opposing face 454 is a flat surface extending radially outward of the shaft 452 in an annular shape. The support 52 of the damper mount housing 5 has an opposing face 523 that faces the motor housing 4 around the opening 521. The opposing face 523 is a flat surface extending radially outward of the opening 521 in an annular shape. An annular protrusion 524 protruding toward the opposing face 454 of the motor housing 4 is integrally formed on the outer periphery of the opposing face 523. In the normal state with no overload on the vehicle damper 1, the two opposing faces 454 and 523 are spaced from each other and face each other. The opposing face 454 of the motor housing 4 and the protrusion 524 of the damper mount housing 5 are spaced from each other without making contact with each other.

An additional rubber 6 which is an elastic member made of rubber or any other suitable material is attached to one of the two opposing faces 454 and 523, i.e., the opposing face 454 of the motor housing 4. The additional rubber 6 has an annular shape and protrudes from the opposing face 454 toward the opposing face 523 of the damper mount housing 5. In the normal state with no overload on the vehicle damper 1, the additional rubber 6 makes no contact with the opposing face 523 of the damper mount housing 5 and faces the opposing face 523 radially inward of the protrusion 524 with a predetermined gap S left between the additional rubber 6 and the opposing face 523 as shown in FIG. 2. The maximum height of the additional rubber 6 protruding from the opposing face 454 is slightly greater than the height of the protrusion 524 protruding from the opposing face 523. A distance between the protrusion 524 and the opposing face 454 is greater than a distance between the additional rubber 6 and the opposing face 523. Thus, if the additional rubber 6 is overloaded as will be described later, the protrusion 524 of the damper mount housing 5 makes contact with the opposing face 454 of the motor housing 4 to protect the additional rubber 6 from excessive compression. The additional rubber 6 corresponds to a second elastic member.

The additional rubber 6 may be made of an elastic material same as or different from the damper mount rubber 53. The additional rubber 6 preferably has higher rigidity than the damper mount rubber 53. The rigidity of the additional rubber 6 is suitably adjusted by selecting the shape of the additional rubber 6, the type of the elastic material used, the content of a filler or any other ingredients blended in the elastic material, and the conditions for producing the rubber.

How the vehicle damper 1 operates in a loaded state will be described below.

The movable member 2 of the vehicle damper 1 moves with linear motion relative to the second inner cylinder 41 in an extending direction X1 and a retracting direction X2 indicated by a double-headed arrow in FIGS. 1 and 2 according to the load applied from the wheel. The linear motion of the movable member 2 cause the ball screw nut 26 to move along the ball screw 43, allowing the ball screw 43 to rotate about the axis. This rotation causes the rotor 32 of the electric motor 3 connected to the ball screw 43 to rotate. Specifically, in the vehicle damper 1, the ball screw nut 26 of the movable member 2 and the ball screw 43 in the second inner cylinder 41 of the motor housing 4 constitute a conversion member 7 that converts the linear motion of the movable member 2 into rotational motion. When a load is applied, a predetermined current is supplied to the coil 311 of the electric motor 3 to attenuate the rotational force of the rotor 32 by the electromagnetic force of the electric motor 3, damping the linear motion of the movable member 2.

In the normal state with no overload, load F1 (vibrations) from the wheel is transmitted from the movable member 2 to the ball screw 43, and then transmitted from the ball screw 43 to the motor housing 4 via the connector 431 and the bearing 44 as indicated by an arrow line. The load F1 transmitted to the motor housing 4 is transmitted to the damper mount rubber 53 via the shaft 452 and the flange 453, damped by the damper mount rubber 53, and transmitted to the vehicle body BD. At this time, the movable member 2 moves with linear motion relative to the second inner cylinder 41 in the extending direction X1 and the retracting direction X2 without making contact with the bump rubber 42 of the motor housing 4. Thus, the additional rubber 6 attached to the motor housing 4 makes no contact with the opposing face 523 of the damper mount housing 5, i.e., is kept spaced from the opposing face 523 of the damper mount housing 5 with the gap S left.

Figure 4A:
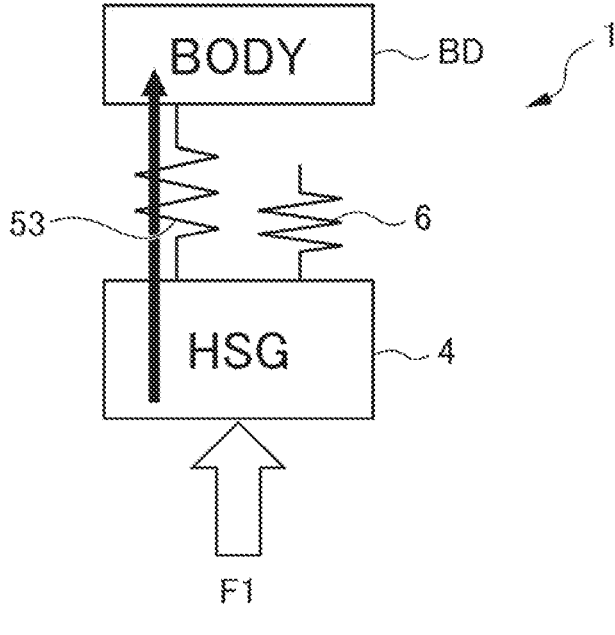
FIG. 4A is a schematic view illustrating the function of the vehicle damper in the normal state.

Specifically, in the normal state with no overload, the motor housing 4 and damper mount housing 5 of the vehicle damper 1 are connected only via the damper mount rubber 53 as shown in FIG. 4A, and the damper mount rubber 53 dampens the load F1. The motor housing 4 and the damper mount housing 5 are spaced from each other, making no contact between metals. This ensures a comfortable ride of the vehicle in the range of regular use.

Figure 3:
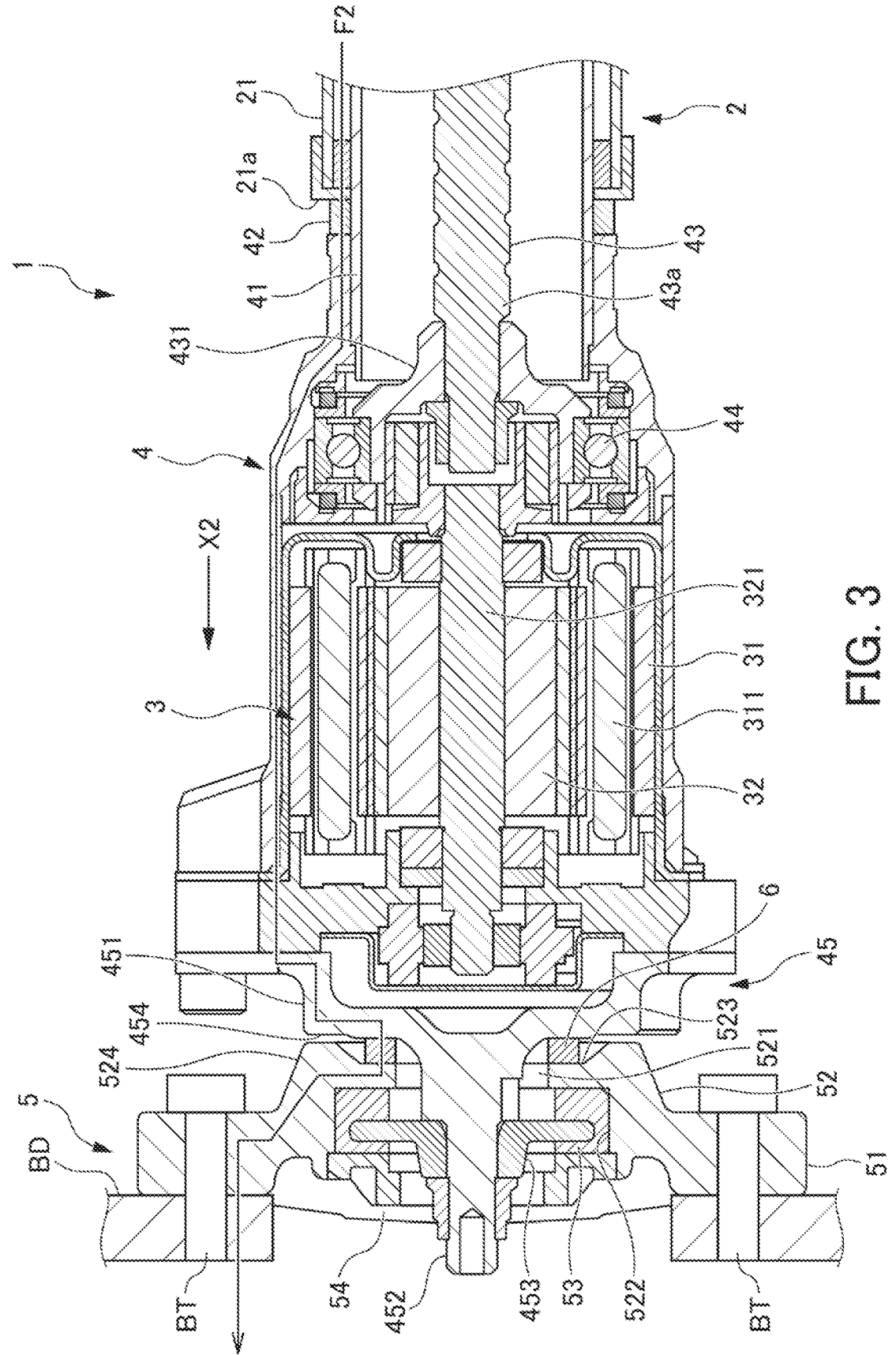
FIG. 3 is a sectional view illustrating the vehicle damper in an overloaded state, partially enlarged.

On the other hand, when overloaded from the wheel in the retracting direction X2 of the movable member 2, the movable member 2 moves with a large linear motion toward the motor housing 4 as shown in FIG. 3. When a tip end 21a of the outer cylinder 21 makes contact with the bump rubber 42, the motor housing 4 moves toward the damper mount housing 5. The motor housing 4 approaches the damper mount housing 5 while compressing the damper mount rubber 53 with the flange 453 of the shaft 452. Then, the additional rubber 6 of the motor housing 4 abuts on the opposing face 523 of the damper mount housing 5. At this time, the protrusion 524 of the damper mount housing 5 does not make contact yet with the opposing face 454 of the motor housing 4. Thus, load F2 (vibrations) from the wheel is transmitted from the outer cylinder 21 of the movable member 2 to the motor housing 4 via the bump rubber 42 without passing the ball screw 43 as indicated by an arrow line in FIG. 3. The load F2 transmitted to the motor housing 4 is transmitted to the damper mount rubber 53 via the additional rubber 6.

Figure 4B:
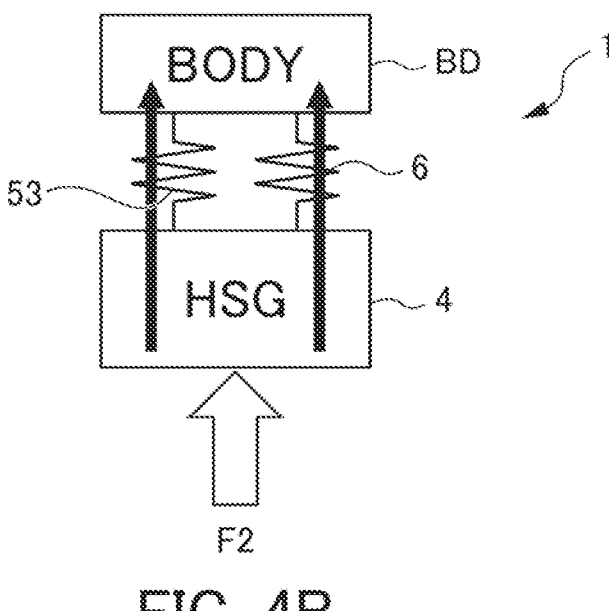
FIG. 4B is a schematic view illustrating the function of the vehicle damper in the overloaded state.

Specifically, when the overload is applied, the motor housing 4 and damper mount housing 5 of the vehicle damper 1 are connected via the damper mount rubber 53 and the additional rubber 6 as shown in FIG. 4B, and the damper mount rubber 53 and the additional rubber 6 bear the load F2 together, absorbing the impact. This reduces the load on the damper mount rubber 53, enhancing the durability of the damper mount rubber 53. The motor housing 4 bears the load F2 by merely moving in the gap S between the additional rubber 6 and the opposing face 523. The additional rubber 6 immediately responds to the overload.

The additional rubber 6 has higher rigidity than the damper mount rubber 53. Thus, the damper mount rubber 53 that is less rigid (soft) provides high antivibration property in the normal state, and the additional rubber 6 with high rigidity provides improved impact resistance when overloaded. This allows the vehicle damper 1 to achieve well-balanced antivibration property and impact resistance.

The additional rubber 6 having an annular shape can respond to bending and twisting stresses applied in all directions due to the overload. Moreover, the additional rubber 6 is placed on the opposing face 454 located around the shaft 452 of the motor housing 4, bearing the stress on the opposing face 454 when the stress is caused by the overload and transmitted from the shaft 452 to the surrounding opposing face 454. Thus, the additional rubber 6 of the vehicle damper 1 can effectively relieve the bending and twisting stresses caused on the shaft 452 by the overload.

Figure 5:
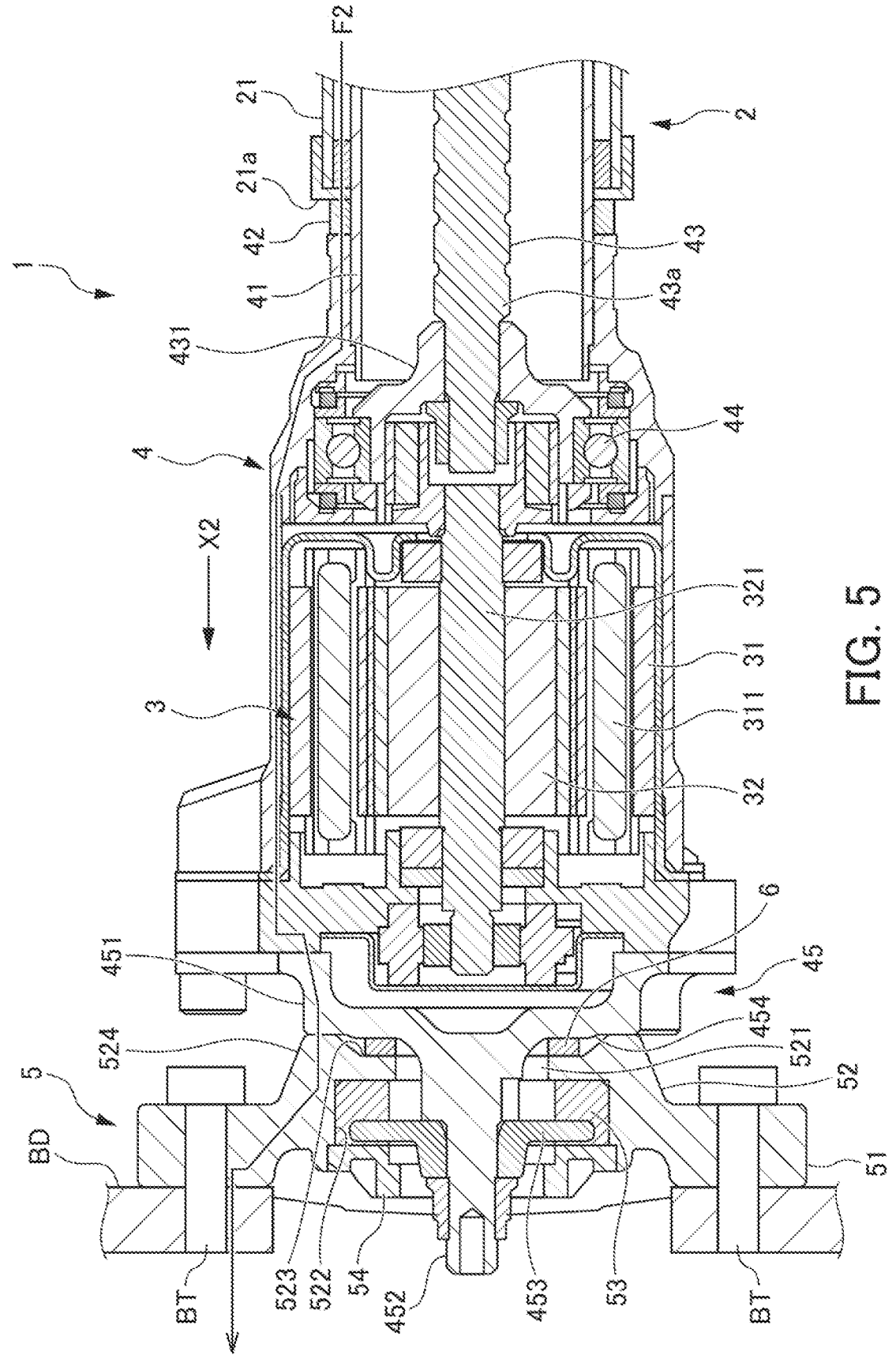
FIG. 5 is a sectional view illustrating the vehicle damper in a more overloaded state, partially enlarged.

When the load F2 in the retracting direction X2 of the movable member 2 increases, the additional rubber 6 is compressed and flattened between the opposing faces 454 and 523 as shown in FIG. 5. This brings the motor housing 4 and the damper mount housing 5 closer to each other, and soon the protrusion 524 of the damper mount housing 5 abuts on the opposing face 454 of the motor housing 4. The motor housing 4 and the damper mount housing 5, both are made of metal, make contact with each other. Thus, the additional rubber 6 is no longer compressed, i.e., protected from excessive compression.

Figure 6:
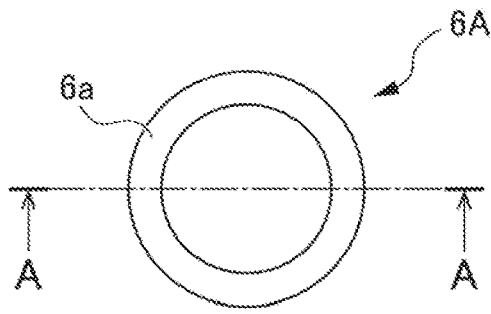
FIG. 6 is a plan view illustrating a second elastic member.
Figure 7:
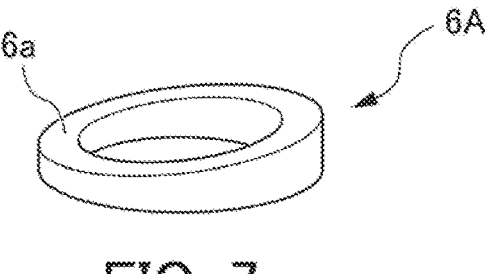
FIG. 7 is a perspective view illustrating the second elastic member.

The load on the movable member 2 of the vehicle damper 1 is not always applied parallel to the axial direction of the movable member 2. The load on the movable member 2 may be applied at an angle with respect to the axial direction of the movable member 2 depending on the camber and caster of the wheels. In this case, the annular additional rubber is not required to have an equal thickness in the whole circumferential direction. For example, as an additional rubber 6A shown in FIGS. 6 to 8, a contact surface 6a to be in contact with a counterpart member may be inclined with respect to the axial direction D of the additional rubber 6A.

Figure 8:
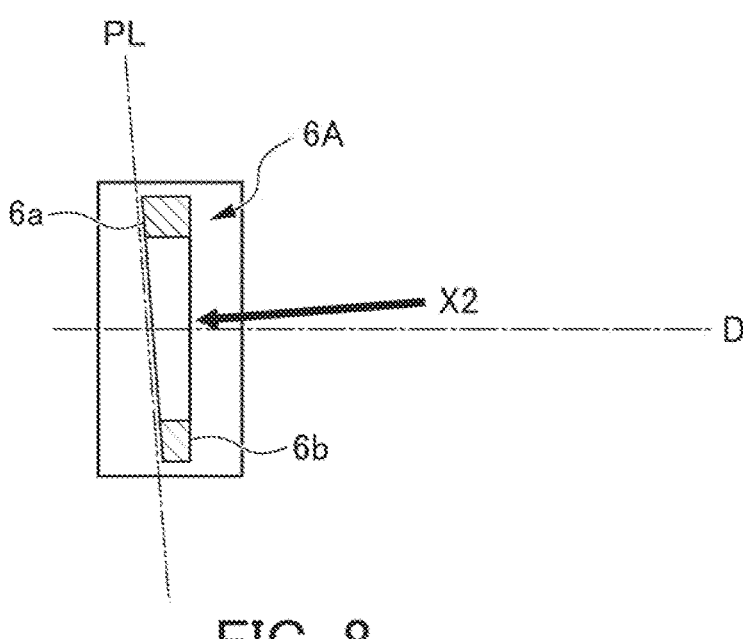
FIG. 8 is a sectional view taken along line A-A of FIG. 6, illustrating the second elastic member and a loading direction.

Specifically, when the load is applied obliquely with respect to the axial direction of the movable member 2, the linear motion of the movable member 2 in the retracting direction X2 is inclined with respect to the axial direction D of the additional rubber 6A as shown in FIG. 8. The contact surface 6a of the additional rubber 6A is substantially parallel to a plane PL perpendicular to the direction of the linear motion in the retracting direction X2. A mount surface 6b of the additional rubber 6A opposite to the contact surface 6a is perpendicular to the axial direction D of the additional rubber 6A. The mount surface 6b is a surface to be attached to the opposing face 454 or 523, and thus is parallel to the opposing face 454 or 523.

Figure 9:
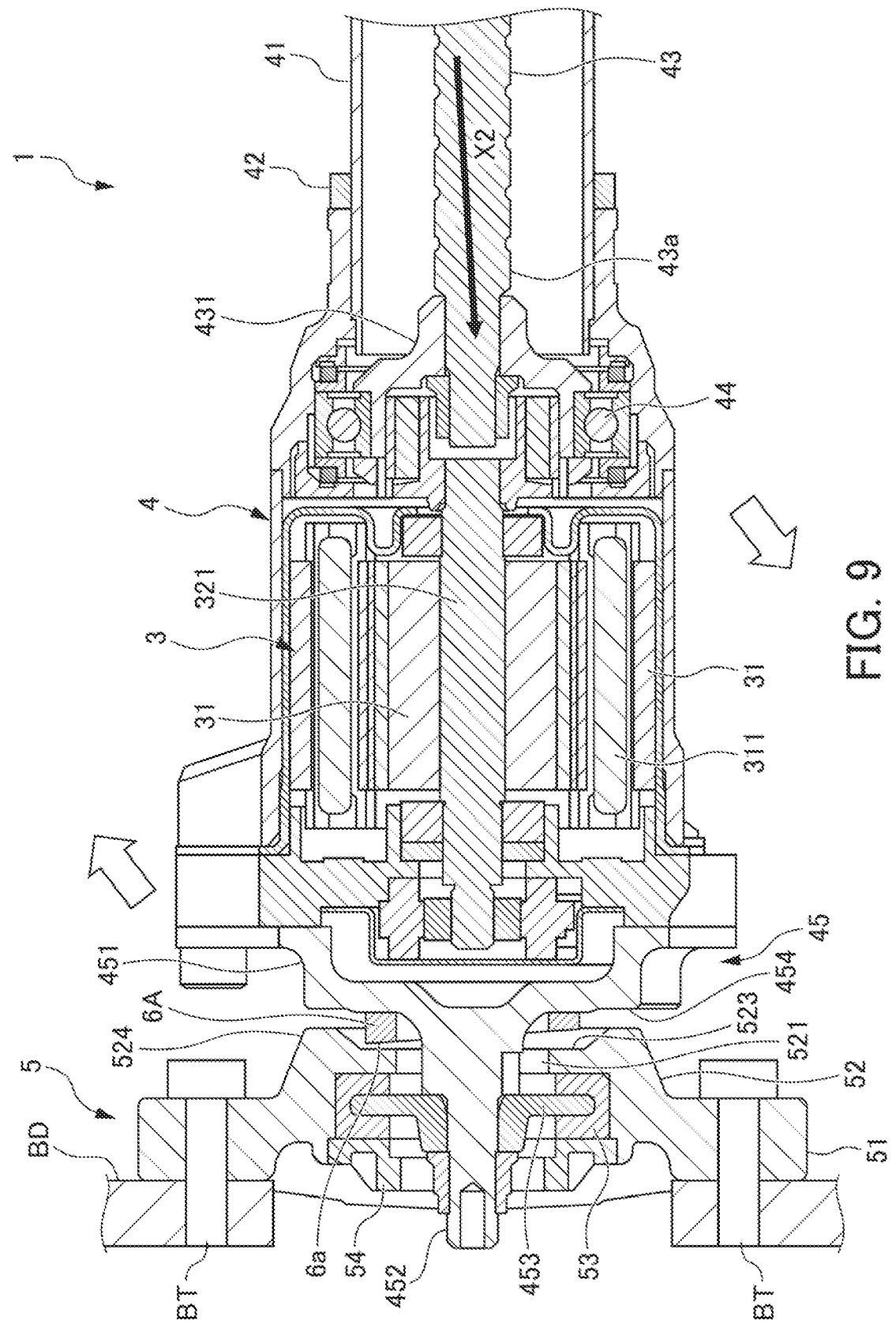
FIG. 9 is a sectional view illustrating the vehicle damper having the second elastic member shown in FIGS. 6 to 8, partially enlarged.

When the mount surface 6b of the additional rubber 6A is attached to the opposing face 454 of the motor housing 4, the contact surface 6a is inclined with respect to the opposing faces 454 and 523 as shown in FIG. 9. When the movable member 2 is overloaded in the retracting direction X2 inclined with respect to the axial direction D of the additional rubber 6A, a bending moment is applied to the motor housing 4 as indicated by open arrows in FIG. 9. This causes the second inner cylinder 41 to move downward and the end member 45 of the motor housing 4 to move upward, rotating the motor housing 4 in a clockwise direction in FIG. 9. As a result, the whole motor housing 4, tilted with respect to the damper mount housing 5, approaches the damper mount housing 5. Although the motor housing 4 is tilted, the inclined contact surface 6a of the additional rubber 6A is substantially parallel to the opposing face 523 of the damper mount housing 5 and can bear the load as a whole to relieve the stress.

Although the additional rubber 6 or 6A is attached to the opposing face 454 of the motor housing 4 in the embodiment described above, the additional rubber 6 or 6A may be attached to the opposing face 523 of the damper mount housing 5.

The additional rubber 6 or 6A is not limited to a single additional rubber. For example, multiple additional rubbers may be concentrically arranged on the opposing face 454 or 523. Some of the concentrically arranged additional rubbers 6 or 6A may be arranged on the opposing face 454 and the other may be arranged on the opposing face 523. When the additional rubbers 6 or 6A are separately arranged on the opposing faces 454 and 523, the additional rubbers 6 or 6A may abut on each other when overloaded.

The additional rubber 6 or 6A may partially be in contact with a counterpart member with no gap S left, without impairing the antivibration property in the normal state with no overload.

In the above embodiment, the opposing face 523 of the damper mount housing 5 has the protrusion 524 protruding toward the opposing face 454 of the motor housing 4. However, the opposing face 454 of the motor housing 4 may have such a protrusion protruding toward the opposing face 523 of the damper mount housing 5. Each of the opposing faces 454 and 523 may have the protrusion so that the protrusions abut on each other when overloaded. The protrusion is not always provided radially outward of the additional rubber 6 or 6A. The protrusion may be provided radially inward of the additional rubber 6 or 6A, or multiple protrusions may be provided radially inward and outward of the additional rubber 6 or 6A.

The vehicle damper 1 of the above embodiment has the following advantages.

The vehicle damper 1 of the present embodiment includes: the movable member 2 that moves with linear motion according to a load applied from a wheel; the conversion member 7 (the ball screw nut 26 and the ball screw 43) that converts the linear motion of the movable member 2 into rotational motion; the electric motor 3 having the rotor 32 that rotates in conjunction with the rotational motion converted by the conversion member 7; the motor housing 4 that houses the electric motor 3; and the damper mount housing 5 that is fixed to the vehicle body BD and connected to the motor housing 4 via the damper mount rubber 53 (the first elastic member). The vehicle damper dampens the linear motion of the movable member 2 by the electromagnetic force of the electric motor 3, and has the additional rubber 6, 6A (the second elastic member) that is provided for at least one of the motor housing 4 or the damper mount housing 5 and abuts on the other of the motor housing 4 or the damper mount housing 5 when a load is applied and the motor housing 4 and the damper mount housing 5 approach each other.

When the vehicle damper 1 is overloaded, both of the damper mount rubber 53 and the additional rubber 6, 6A can bear the overload. Thus, the vehicle damper 1 can immediately absorb an impact without overloading the damper mount rubber 53. The vehicle damper 1 can make the vehicle behave more stably.

The additional rubber 6, 6A of the present embodiment has higher rigidity than the damper mount rubber 53.

9      10

Thus, the damper mount rubber 53 that is less rigid (soft) in the normal state with no overload can provide high antivibration property, and the additional rubber 6 with high rigidity can provide improved impact resistance when overloaded. This allows the vehicle damper 1 to achieve well-balanced antivibration property and impact resistance.

The additional rubber 6, 6A of the present embodiment has an annular shape.

This allows the additional rubber 6, 6A to respond to bending and twisting stresses applied in all directions due to the overload.

In the present embodiment, the motor housing 4 has the shaft 452 that is connected to the damper mount housing 5 via the damper mount rubber 53. The motor housing 4 and the damper mount housing 5 have the opposing faces 454 and 523 that are spaced from each other and facing each other around the shaft 452. The additional rubber 6, 6A is provided on the opposing face of at least one of the motor housing 4 or the damper mount housing 5.

When the stress caused by the overload is transmitted from the shaft 452 to the surrounding opposing face 454, the opposing face 454 can receive the stress. Thus, the additional rubber 6, 6A of the vehicle damper 1 can effectively relieve the bending and twisting stresses caused on the shaft 452 by the overload.

In the present embodiment, at least one of the motor housing 4 or the damper mount housing 5 has the protrusion 524 that protrudes toward the other of the motor housing 4 or the damper mount housing 5 to protect the additional rubber 6, 6A from excessive compression.

When an excessive load is applied, the motor housing 4 and the damper mount housing 5, which are both metal members, make contact with each other, protecting the additional rubber 6 from excessive compression.

In the present embodiment, the contact surface 6a of the additional rubber 6A to be in contact with the other of the motor housing 4 or the damper mount housing 5 is inclined with respect to the opposing face 523 of the other of the motor housing 4 or the damper mount housing 5 and is substantially parallel to a plane perpendicular to the direction of the linear motion of the movable member 2.

Although the motor housing 4 that is tilted by the bending moment applied by the linear motion of the movable member 2 approaches the damper mount housing 5, the whole contact surface 6a of the additional rubber 6A can bear the load to relieve the stress.

EXPLANATION OF REFERENCE NUMERALS

1 Vehicle damper
2 Movable member
3 Electric motor
32 Rotor
4 Motor housing
452 Shaft
454, 523 Opposing face
5 Damper mount housing
53 Damper mount rubber (first elastic member)
524 Protrusion
6, 6A Additional rubber (second elastic member)
7 Conversion member
BD Vehicle body
PL Plane

What is claimed is:

1. A vehicle damper, comprising:
a movable member that moves with linear motion according to a load applied from a wheel;
a conversion member that converts the linear motion of the movable member into rotational motion;
an electric motor having a rotor that rotates in conjunction with the rotational motion converted by the conversion member;
a motor housing that houses the electric motor; and
a damper mount housing that is fixed to a vehicle body and connected to the motor housing via a first elastic member, wherein
the conversion member is constituted of a ball screw and a ball screw nut, the ball screw being provided in the movable member, the ball screw nut being threadedly engaged with the ball screw,
the vehicle damper dampens the linear motion of the movable member by an electromagnetic force of the electric motor,
the movable member comprises
an outer cylinder including a connecting part that has one end to be connected to the wheel,
a first inner cylinder housed in the outer cylinder and extending in an axial direction of the outer cylinder, and
a second inner cylinder housed in the outer cylinder, housing herein the first inner cylinder, and having one end connected to the motor housing,
the motor housing has an impact-absorbing member attached to an edge of one end of the motor housing, the impact-absorbing member surrounding an outer periphery of the second inner cylinder and facing one end of the outer cylinder, and
the vehicle damper has a second elastic member that is provided for at least one of the motor housing or the damper mount housing and abuts on the other of the motor housing or the damper mount housing when a load is applied and the motor housing and the damper mount housing approach each other.

2. The vehicle damper of claim 1, wherein the second elastic member has higher rigidity than the first elastic member.

3. The vehicle damper of claim 1, wherein the second elastic member has an annular shape.

4. The vehicle damper of claim 3, wherein the motor housing has a shaft connected to the damper mount housing via the first elastic member,
the motor housing and the damper mount housing have opposing faces that are spaced from each other and face each other around the shaft,
the second elastic member is provided on the opposing face of at least one of the motor housing or the damper mount housing.

5. The vehicle damper of claim 1, further comprising a protrusion that protrudes from at least one of the motor housing or the damper mount housing toward the other of the motor housing or the damper mount housing to protect the second elastic member from excessive compression.

6. The vehicle damper of claim 1, wherein a contact surface of the second elastic member to be in contact with the other of the motor housing or the damper mount housing is inclined with respect to an opposing face of the other of the motor housing or the damper mount housing and is substantially parallel to a plane perpendicular to the direction of the linear motion of the movable member.

\* \* \* \* \*